United States Patent [19]
Clancy et al.

[11] 4,265,554
[45] May 5, 1981

[54] PARAGRAPH INDENT

[75] Inventors: Douglas E. Clancy, Austin, Tex.; Carl F. Johnson; William R. McCray, both of Lexington, Ky.; Danny M. Neal, Austin, Tex.

[73] Assignee: International Business Machines Corporation, Armonk, N.Y.

[21] Appl. No.: 908,325

[22] Filed: May 22, 1978

[51] Int. Cl.³ .............................................. B41J 25/18
[52] U.S. Cl. .................................... 400/316; 400/279
[58] Field of Search ........................ 400/61, 62, 63, 67, 400/68, 69, 70, 76, 279, 280, 316, 343

[56] References Cited
U.S. PATENT DOCUMENTS

| 3,579,193 | 5/1971 | Bernier | 400/63 X |
| 3,837,459 | 9/1974 | Martin | 400/63 |
| 4,087,852 | 5/1978 | Campbell et al. | 364/200 |

OTHER PUBLICATIONS

IBM Technical Disclosure Bulletin, "Variable Left Margin with Counter Control", Hobgood et al, vol. 10, No. 2, Jul. 1967, pp. 109–110.

Primary Examiner—Ernest T. Wright, Jr.
Attorney, Agent, or Firm—Laurence R. Letson

[57] ABSTRACT

Described herein is a feature and the electronics and logic necessary to implement a paragraph indent feature on an electronic typewriter which is improved and more advantageous than previous routines which accomplished similar results. Paragraph Indent is beneficial to the operator in that it automatically positions the printing carrier at an indented level for setting off typed material so that the left edge of the indented material does not extend to the normal left margin. The typewriter under electronic control stores in memory, upon an appropriate command, a temporary left margin to which the carrier will return when the typewriter is operating under the paragraph indent mode. The operator may enter the Paragraph Indent mode from the keyboard by keying an alternate function or code signal together with a tabulation or tab code signal. This causes the electronics to control the typewriter so as to move the print point to the next tab stop and thereafter until countercommanded will return the carrier to that indented line position on all subsequent carrier returns.

4 Claims, 8 Drawing Figures

PARAGRAPH INDENT

BACKGROUND OF THE INVENTION

Typewriters with electronic controls exist and have existed where the combination of commands within a logical control effect a positioning of the print point of the carrier at an indented level upon a carrier return. This is accomplished on prior art devices by placing into the controls a command which then causes a required and automatically initiated tabulation command upon each carrier return being completed. The effect of this is that the carrier returns to the left margin and then tabs outward from the left margin to the indented level. This routine is implemented by storing into memory a requirement that upon the initiation of each carrier return the carrier return automatically causes the subsequent initiation of one or more required tab operations prior to the carrier coming to rest at the indented level for printing.

It is an object of this invention to directly, by the most direct path of movement, position the print carrier at an indented level upon the entering of a carrier return command while operating in a Paragraph Indent mode.

It is another object of this invention to eliminate the need for the carrier to return to the left most margin and tabulate out therefrom to effect paragraph indentation.

It is still another object of this invention to minimize the amount of time necessary to carrier return to an indented level.

It is still a further object of this invention to eliminate distraction to the operator by minimizing the number of machine operations to accomplish Paragraph Indent.

SUMMARY OF THE INVENTION

Figure 1:
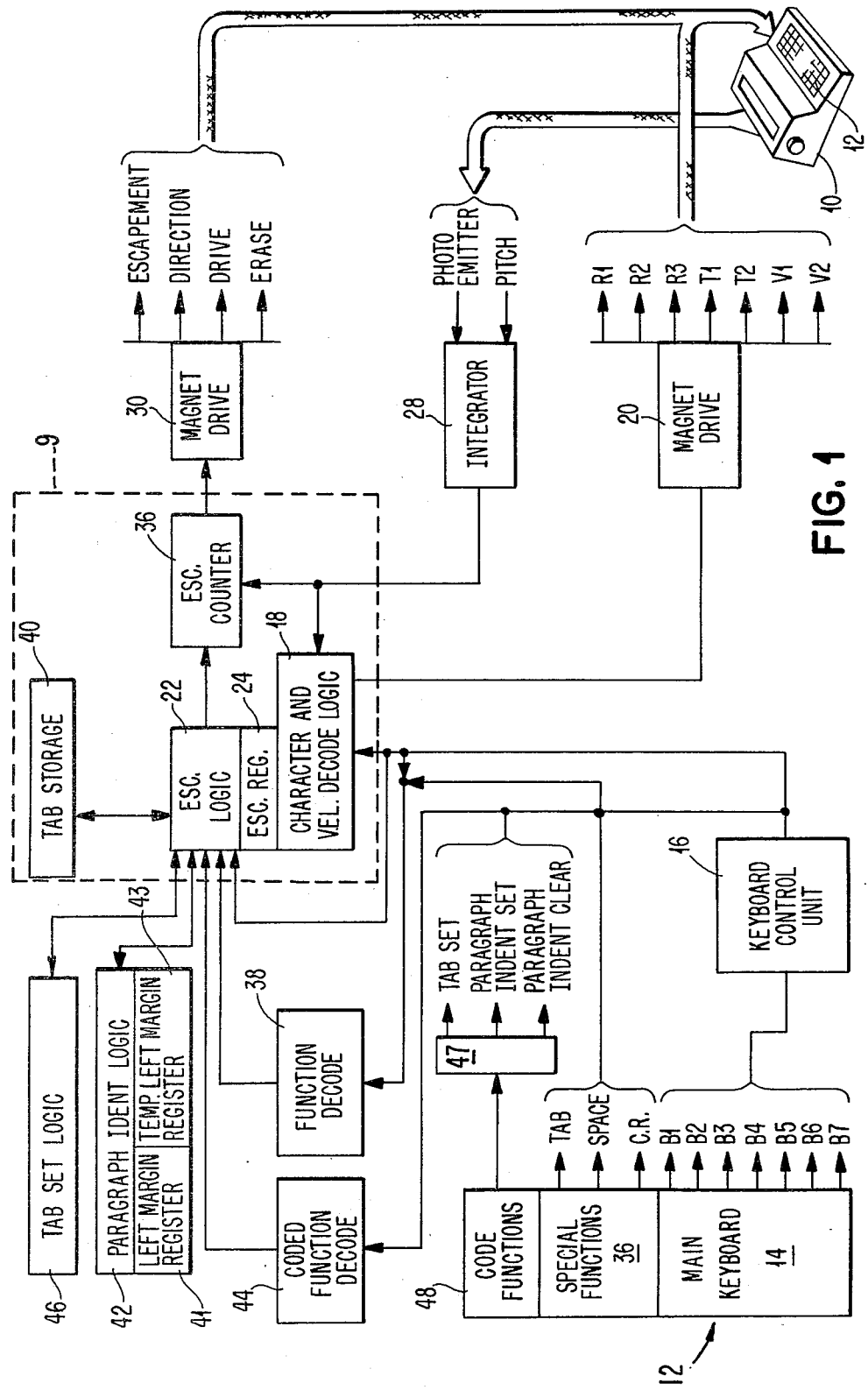
FIG. 1 is a block diagram of the electronics and logic controls for an electronic typewriter that is capable of controlling the typewriter in such a manner as to implement the described invention.
Figure 2:
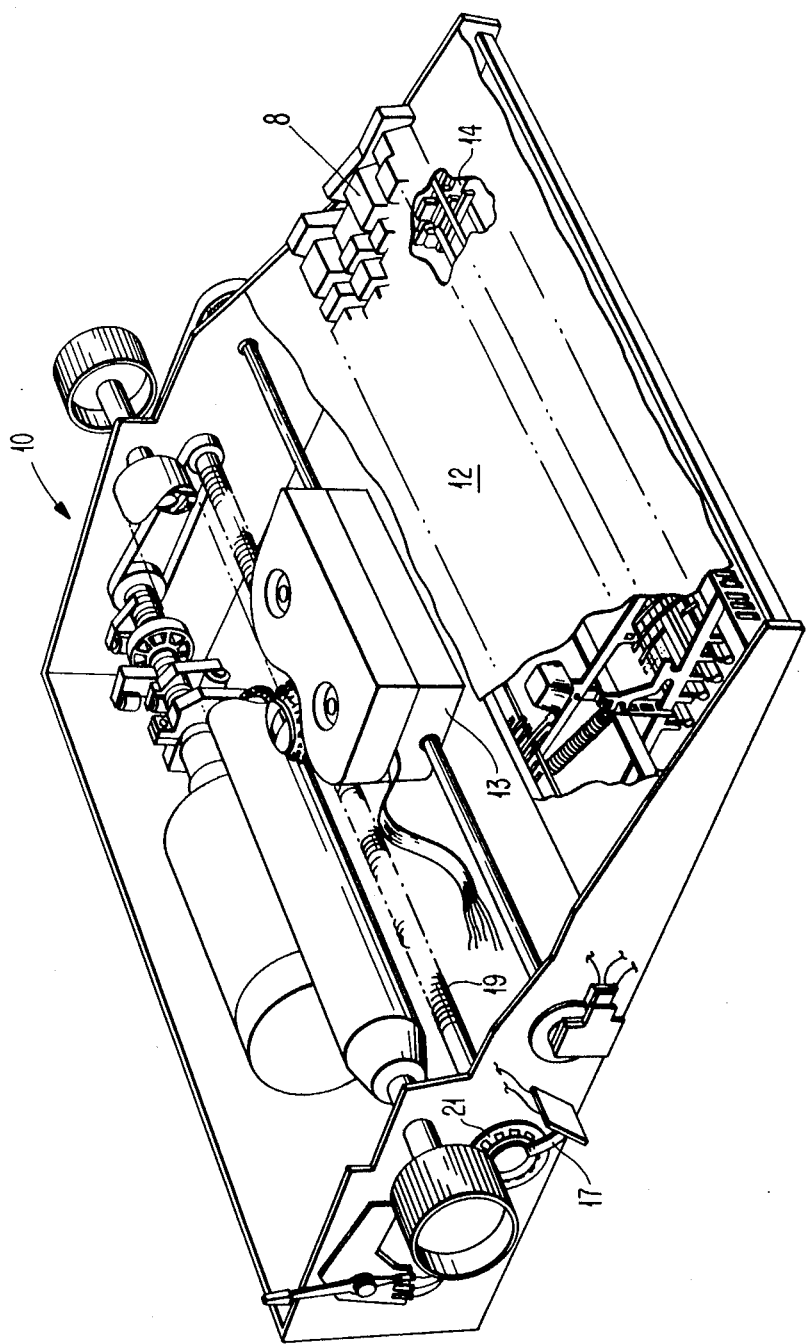
FIG. 2 is a drawing of the drives and printing member together with their associated controls for effecting movement of the print carriage and printing.

In order to cause paragraph indentation in an efficient and expedient manner, it is desirable to cause the carrier to return only as far as necessary to be aligned with the indented position. Upon the commanding of the typewriter to enter a paragraph indent mode of operation, the paragraph indent logic determines the next tab stop to the right and uses that as a destination to which the carrier must move and at the time designates that value as determined from the tab stop storage as the temporary left margin. Upon subsequent carrier returns the value of the selected tab stop location is then used in lieu of the normal left margin location and the carrier is reverse escaped in a carrier return mode to that location. This causes a shortened carrier return and eliminates the need for required tabulation operations after each carrier return. The Paragraph Indent logic then continues to control the carrier returns to the indented level until the logic receives a clear command in the form of a coded or alternate function carrier return. When this occurs the temporary left margin is removed from the logic and the controls are then free to carrier return to the normal left margin.

DETAILED DESCRIPTION OF THE INVENTION

The typewriter 10 has a keyboard 12 which converts mechanical key movement to electrical signals and outputs these signals from main keyboard 14, through keyboard control unit 16, and special functions section 36 and coded functions section 48 which then send the electrical signals to coded function decode 44, function decode 38 or character and velocity decode 18. In the case of characters, the character and velocity decode 18 outputs signals to the magnet drivers 20 which are data signal controlled switches to control electromagnets for operation of mechanical controls to effect character selections and printing. The signal outputs of the magnet drivers 20 are R1, R2, R3 for controlling rotation, T1, T2 for controlling tilt of the typehead and V1 and V2 for controlling the print velocity. The special functions section 36 outputs signals directly to the function decode 38 to control such operations as space, tab, and erase.

Referring to FIG. 1, it is assumed that the typewriter 10 is typing and that the operator desires to set tabs. The setting of the tabs is accomplished by the generation of the code or alternate function signal in conjunction with an alphanumeric signal B1-B7 from the keyboard 12 which generates signals emanating from main keyboard 14 and these combined signals result in a tab set command. Upon the generation of these two signals, the coded function decode logic 38 decodes the keyboard signals and transmits them to the escapement logic 22. The escapement logic 22 determines that the command is not an escapement function and transfers control to the tab set logic 46. The tab set logic 46 through the escapement logic 22 accesses the escapement register 24 to determine the location of the carrier 13 and print point at the time that the tab set signal is entered. The value of the escapement register 24 at that time is then inserted, in proper sequence with other stored values, into the tab storage register 40. The tabulation value or tab set value is inserted such that the tab stop may be accessed upon the subsequent tabulation command in proper order progressing from left to right along the page.

With tabs stored into the tab storage register 40, it is then possible to use these values in the paragraph indent routines and functions.

The coded functions section 48 of keyboard 12 outputs a signal to box 47 which shows that tab set, paragraph indent and paragraph indent clear signals all emanate from coded functions section 48. Those signals are a combination of the signal from coded functions section 48 and a bail code combination signal B1-B7 from main keyboard 14.

Assuming now that the operator has set all desired tabs following the sequence of commands, the operator is then free to begin typing. At some point in a document, the operator may desire to indent subsequent material to a level to the right of the left margin. This is accomplished by the generation of the code or alternate function signal together with the tab or paragraph indent set signal from the keyboard 12. This combined signal from the keyboard 12 is passed through the coded function decode 44 to effect decoding of these keyboard signals and the transmission of the output to the escapement logic 22. The escapement logic 22 recognizes this signal as a paragraph indent command and then performs two operations. First, the logic 22 causes a normal tabulation typewriter function to the next right most tab stop position under the control of the Paragraph Indent logic 42. Secondly, it surrenders partial control to the Paragraph Indent logic 42 to cause the escapement logic 22 to retrieve the tab stop value stored in the tab storage register 40 previously and to place that value into a temporary left margin register 43 within the Paragraph Indent logic 42 to act as a temporary left margin value.

The tabulation accomplished by the entering of the Paragraph Indent command may be repeated to a second or third level if further indentation is desired. Upon the additional entry of such codes the above sequence of decoding and the transmission of commands is repeated with the next tab storage position being retrieved and stored into the temporary left margin register 43.

Upon the initiation of a carrier return by depression of a line beginning control key 8, the function decode logic 38 transmits the decoded signals to the escapement logic 22 and causes the reverse movement of the carrier 13, in any one of a number of conventional techniques to the left margin. The left margin position is determined by either a value stored in a left margin register 41 or within the temporary left margin register 43 of the paragraph indent logic 42. The carrier 13 is reverse escaped to that point and stopped.

The clearance of the Paragraph Indent mode may be accomplished by the generation of the alternate or code function signal together with the carrier return signal which is the Paragraph Indent clear code. The combined signal is decoded and passed to the escapement logic 22 which recognizes it as a clearance command and removes the value in the temporary left margin register 43 in the Paragraph Indent logic 42. The escapement logic 22 then accesses the value stored in the left margin register 41 and places it into the temporary left margin register 43. Thus on subsequent carrier returns, the value accessed under escapement logic control 22 from the temporary left margin register 43, which is accessed on all carrier returns, will represent that of the original left margin set by the operator until such time as it is changed through a Paragraph Indent command.

The paragraph indent loigc 42 not only acts as a line beginning defining means in conjunction with the left margin register's contents but controls both left margin registers 41, 43.

The driving of the carrier 13 of typewriter 10 to accomplish carrier return and tabulation is performed under the control of the escapement logic 22 and escapement counter 36 which control magnet drivers 30. The escapement logic 22, escapement register 24, character and velocity decode logic 18, escapement counter 36, and tab storage register 40 make up printer control 9.

Integrator 28 receives signals from the photo emitter sensor 17 created by emitter wheel 21 and rotation of leadscrew 19, and provides feedback to escapement counter 36.

Figure 3:
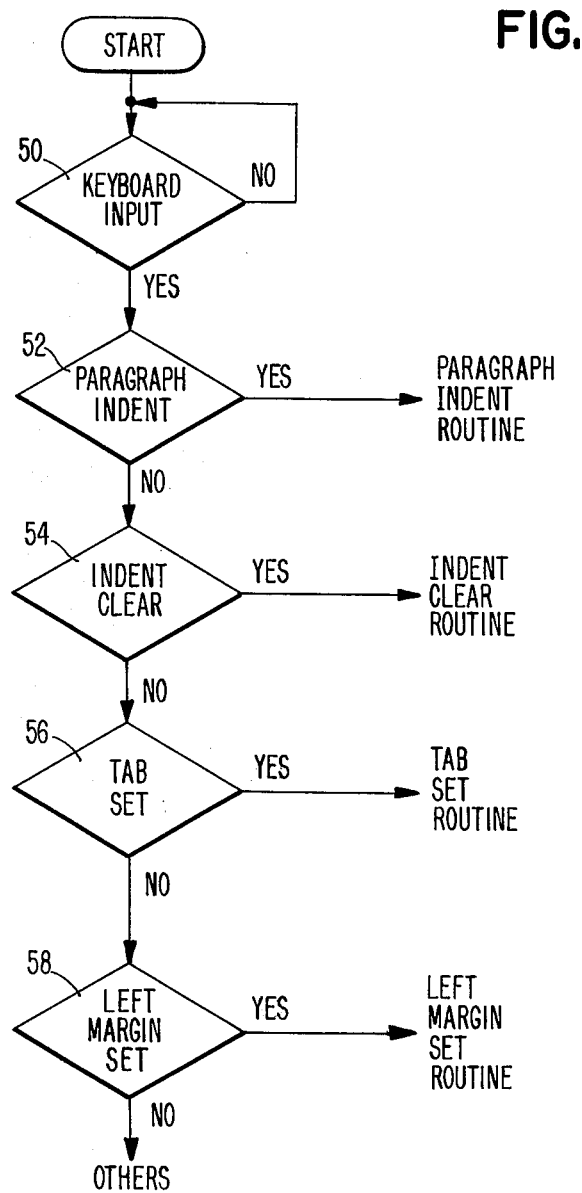
FIGS. 3 through 7 are logical flow charts illustrating an embodiment of the invention.

The controls necessary to control the typewriter 10 which have been explained above in block diagram form are preferably embodied in operational sequences of the electronic logic and devices which may be represented by the flow charts in FIGS. 3 through 6. To more fully understand the operational sequences and logic controls which are part of the block diagram illustrated in FIG. 1, reference is made to FIGS. 3 through 7. Referring to FIG. 3, the main flow of the logic contained in the Paragraph Indent logic 42 is represented in the flow diagram. Upon the receipt of a signal after the starting of the typewriter 10, the routine will accept a signal and the decision is made as to whether the signal is a keyboard input 50. If the decision results in a negative answer the logic 42 will branch back to the initial start position and will await an additional signal, thereby, always being ready for a keyboard input. In the event that the signal received is a keyboard input then the signal is tested to determine whether it is a Paragraph Indent signal 52. If the signal is a Paragraph Indent signal 52 then the logic 42 branches to a Paragraph Indent routine to be described below. If the signal is not a Paragraph Indent signal 52, but rather some other signal, then the signal is tested to determine if it an indent clear signal 54. If the signal represents an indent clear command the indent clear routine is then entered; the indent clear routine will be described below.

If the signal received is not a Paragraph Indent signal 52 and is not an indent clear signal 54, then the signal is tested to determine whether it is a tab set signal 56. If the signal is a tab set signal 56 then the tab set routine is entered. If the signal is not a Paragraph Indent 52, not a indent clear signal 54, and not a tab set signal 56 then the logic 42 is tested to see if the signal is a left margin set 58. If the signal is a left margin set 58 the logic 42 will branch to the left margin set routine which will be described below. If the signal is not any of the above discussed signals then the signal will flow to other decision blocks which are not relevant to the Paragraph Indent routine.

Figure 7:
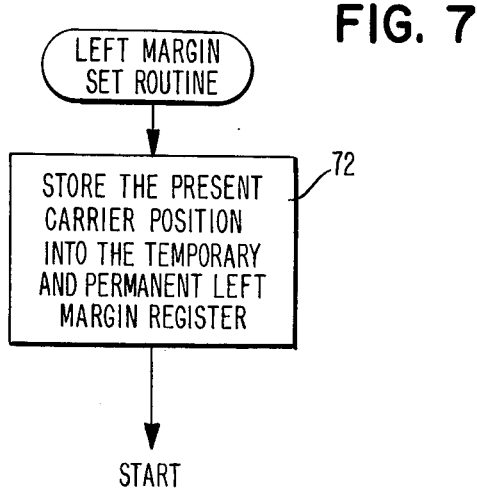

Referring to FIG. 7, the left margin set routine, upon the alternate keyboard entry a left margin is set by the escapement logic 22 by storing the present carrier position into the temporary and permanent left margin register 43 and 41 (block 72).

Figure 4:
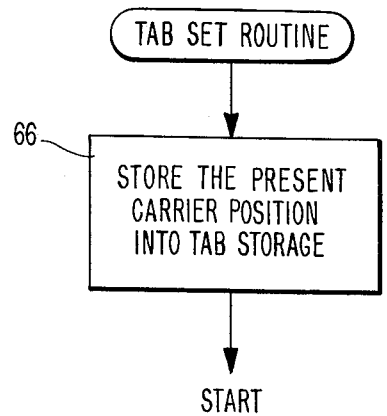

Referring to FIG. 4, the tab set routine, entered upon the detection of a tab set command 56, stores the present carrier position into the tab storage register 40 (block 66).

Upon the completion of the storage of this value into the tab storage register 40 (block 66), the routine branches back to the start position to await further commands.

Figure 5:
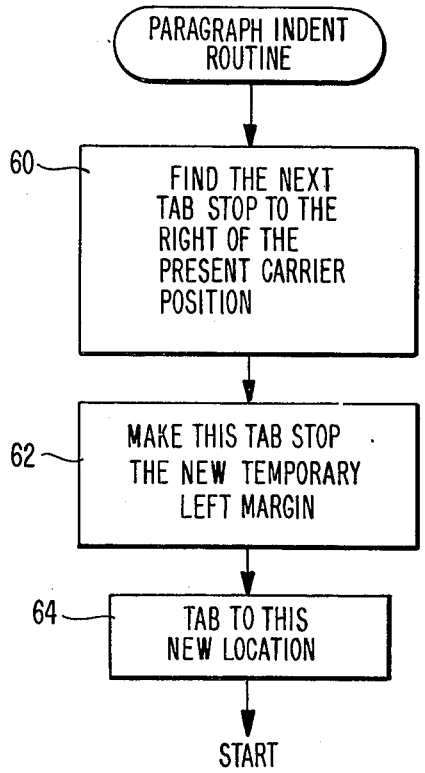
Figure 6:
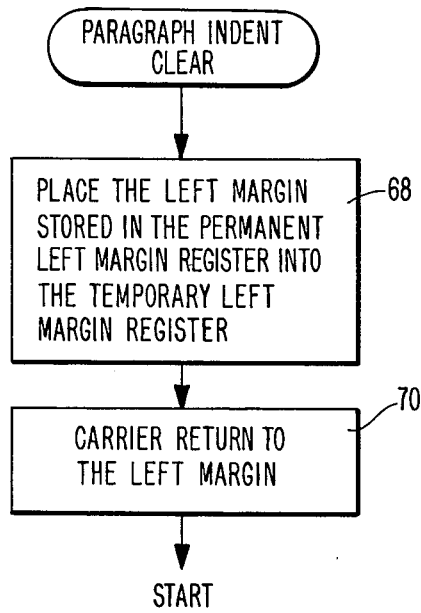

If the signal detected was that of a Paragraph Indent command 52 then the Paragraph Indent routine illustrated in FIG. 5 is entered. The next tab stop to the right of the carrier position at which the Paragraph Indent routine is entered, is determined from the tab storage register 40 (block 60). Upon the determination of that value, that tab stop value is then stored in the temporary left margin register 43 to become the new temporary left margin 62.

After the storage of this value in the temporary left margin register 43 (block 62), the escapement logic 22 is commanded to cause tabulation of the carrier 13 to the tab stop location 64 determined in the first step of this routine.

Upon the completion of the tabulation operation 64, the logic 42 branches back to the start position to await a further signal or command from the keyboard 12 or other signal generating devices of the typewriter 10.

When the typewriter 10 does a normal carrier return thereafter, the value stored in the temporary left margin register 43 will act as the left margin in so far as the logic is concerned and therefore, the carrier 13 will return to that point and stop in preparation for continued typing.

In order to exit from the Paragraph Indent routine and allow the normal carrier return to the original left margin, upon the completion of typing the indented text, the Paragraph Indent clear routine (FIG. 6) is entered as a result of the paragraph indent clear signal. Upon the entering of this routine, the value representing the permanent left margin, which is stored in the permanent left margin register 41 as a result of setting up the original margins, is placed into the temporary left margin register 43 (block 68). The Paragraph Indent clear signal is a coded or alternate function carrier return. Upon the completion of the removal of the indented margin value from the temporary left margin register 43 and the replacement of that the value with the permanent left margin value, the carrier 13 is caused to return 70. The new value in the temporary left margin register 43, corresponding to the original left margin, will determine the position of the carrier 13 at the end of the carrier return. Upon the completion of the carrier return, the logic 42 then branches back to start for receipt and detection of the next signal to be received.

The embodiment which this invention may take may be one of several alternative forms. One form described above in conjunction with the block diagrams and flow charts illustrates one embodiment. An alternative embodiment may be an electronic processor control which may operate in conjunction with a permanently configured read only storage in which a series of instruction and codes may be stored. This electronic apparatus would correspond to the apparatus as described in conjunction with FIGS. 1 through 7.

In such case, an alternative to the flow diagrams illustrated in FIGS. 3 through 7, is that codes or commands may be stored in the read only store to cause the electronics to process the information from the keyboard 12 and to control the printer in a predetermined sequence of steps. The commands and codes stored in the read only store may take the form of those attached in Appendix A and Appendix B. Appendix A is a listing of definitions which identify and are associated with particular registers or particular bits within a byte and equates those register designations and/or bit designates with mnemonics.

Appendix B is the complete listing of a set of instructions which serve to control the processor and may be programed or coded as desired in order to control the electronic processor. Particular embodiments of the code or instructions may be modified as desired by one skilled in the art to accomplish the particular functions of the invention. Additionally it should be recognized that a programmable processor may embody a program which may be written conforming to the requirements of that particular processor for accomplishing the same result.

Referring to Appendix B, Column 1 is the address, in hexadecimal code, where that particular instruction is stored in the location designated by the corresponding information in Column 2. Column 3 is the mnemonics identifying the start point of particular sub-routines. Column 4 is the mnemonics for the instruction which the processor then executes. Column 5 contains mnemonics which then, through definitions and equality statements in Appendix A assigns numerical values for registers or bits as appropriate for the instructions contained in Column 4. Column 6 contains explanatory comments.

Appendix C includes a listing of the instructions, the mnemonics representing these instructions and two columns designated respectively first byte and second byte having also bit positions indicated numerically.

With reference to those bytes illustrated in the two byte columns, these represent how that particular instruction would appear in the read only store memory. The ones and zeros in those bytes are dedicated values which remain unchanged for that particular instruction while the B contained in the instruction code indicates the bits to be tested and the A's are representative of the address to which the instruction series will branch upon the meeting of particular conditions set forth, depending upon whether the bits B are represented by a one or zero. Referring to other instructions, the letter D represents a fixed value in memory and is determined by the individual implementing the particular device.

The R's are representative of the numerical designation for one of thirty-two separate registers which are available for storage of data and which are available to the processor.

Appendix D includes an instruction summary which lists the mnemonic, the name of the instruction represented by the mnemonics and a brief description of the function performed by the processor as a result of executing that particular instruction.

Figure 8:
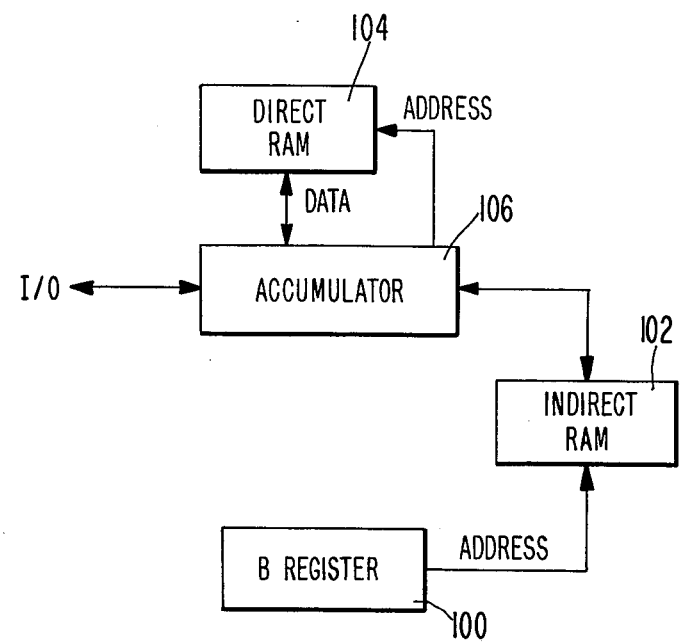
FIG. 8 is a diagram of the register arrangement which will accommodate the code and data from appendixes A through D.

As an aid to understanding the description of the instructions contained in Appendix D, reference should be made to FIG. 8 which is illustrative of the data flow between the register 100, memories 102, 104 and the accumulator 106, in the printer control 9 of FIG. 1.

The elements of FIG. 8 are multi-purpose elements and may process many different data bytes and represent a generalized processor form. Printer control 9 is a functional block diagram which is easier to understand and visualize and could be constructed as such if desired.

While the invention has been particularly shown and described with reference to preferred embodiment(s) thereof, it will be understood by those skilled in the art that the foregoing and other changes in form and details may be made therein without departing from the spirit and scope of the invention.

APPENDIX A

| | | |
|---|---|---|
| LCNT | EQUALS 2 | ADDRESS OF PRESENT CARRIER POSITION |
| MINI | EQUALS 3 | SUBADDRESS OF PRESENT CARRIER POSITION |
| MLCNT | EQUALS 4 | MEMORY LINE COUNT, ADDRESS LINE MEMORY |
| PLM | EQUALS 14 | REGISTER THAT CONTAINS PERMANENT LEFT MARGIN |
| LM | EQUALS 12 | REGISTER THAT STORES THE ACTIVE LEFT MARGIN POSITION |
| KBD | EQUALS 5 | KEYBOARD REGISTER |
| PM | EQUALS 31 | PRINTER MAGNET REGISTER, REPRESENTS OUTPUT TO PRINTER |

APPENDIX A-continued

| | | |
|---|---|---|
| REVMAG | EQUALS 1 | REVERSE MAGNET |
| ESCMAG | EQUALS 3 | ESCAPE MAGNET |
| SENSOR | EQUALS 7 | REGISTER THAT CONTAINS INPUT SENSORS |
| EMT | EQUALS 2 | EMITTER REPRESENTS ONE UNIT OF ESCAPEMENT |
| ECNT | EQUALS 8 | UNITS OF ESCAPEMENT REGISTER |
| WK1 | EQUALS 7 | WORKING REGISTER |
| WK2 | EQUALS 6 | WORKING REGISTER |
| WK3 | EQUALS 0 | WORKING REGISTER |
| WK4 | EQUALS 1 | WORKING REGISTER |
| WK5 | EQUALS 9 | WORKING REGISTER |
| WK6 | EQUALS 13 | WORKING REGISTER |
| ESCTABL | EQUALS 100 | TABLE THAT CONTAINS ESCAPEMENT VALUES OF CHARACTERS |
| VELTABL | EQUALS 200 | TABLE THAT CONTAINS VELOCITY VALUE OF CHARACTERS |
| STRB | EQUALS 1 | STROBE, INDICATES AN INPUT FROM THE KEYBOARD |
| ERTAPE | EQUALS 3 | ERASE TAPE LIFT MAGNET |
| VELMAG | EQUALS 4 | MAGNET THAT SELECTS VELOCITY OF IMPACT |
| CHARMAG | EQUALS 5 | MAGNET THAT SELECTS CHARACTER |
| TABSTOR | EQUALS 100 | LOCATION OF TAB STORAGE |
| B1 | EQUALS 0 | FIRST BAIL FROM KEYBOARD |
| B2 | EQUALS 1 | SECOND BAIL FROM KEYBOARD |
| B3 | EQUALS 2 | THIRD BAIL FROM KEYBOARD |

APPENDIX B

| | | | | | |
|---|---|---|---|---|---|
| 0000 | 9F | START | LR | SENSOR | IS THER AN INPUT FROM KEYBOARD? |
| 0001 | C400 | | TJE | STRB, START | |
| 0003 | AB00 | | LBD | 0 | OBTAIN INPUT |
| 0005 | B0 | | LN | 0 | |
| 0006 | 05 | | STR | KBD | |
| 0007 | AB7A | | LBD | X'7A' | |
| 0009 | 403C | | CJE | PARIND | |
| 000B | AB72 | | LBD | X'72' | |
| 000D | 409A | | CJE | INDCLR | |
| 000F | AB48 | | LBD | X'48' | |
| 0011 | 4015 | | CJE | TABSET | |
| 0013 | 20FA | | BR | OTHERS | |
| 0015 | 82 | TABSET | LR | LCNT | FIND CARRIER POSITION |
| 0016 | 07 | | STR | WK1 | |
| 0017 | 70 | | LDL | 0 | SEARCH TAB STORAGE FOR VALUE LARGER, |
| 0018 | 06 | | STR | WK2 | THE PRESENT CARRIER POSITION |
| 0019 | A6 | TB3 | LBR | WK2 | |
| 001A | B0 | | LN | TABSTOR | |
| 001B | A2 | | LBR | LCNT | |
| 001C | 6034 | | CJL | TB1 | |
| 001E | 07 | | STR | WK1 | STORE INFORMATION |
| 001F | 86 | | LR | WK2 | SHIFT STORAGE |
| 0020 | 00 | | STR | WK3 | |
| 0021 | AA12 | | LDH | 18 | |
| 0023 | 01 | | STR | WK4 | |
| 0024 | A1 | TB5 | LBR | WK4 | |
| 0025 | B0 | | LN | 0 | |
| 0026 | 09 | | STR | WK5 | |
| 0027 | 81 | | LR | WK4 | |
| 0028 | AE | | A1 | | |
| 0029 | AE | | A1 | | |
| 002A | 89 | | LR | WK5 | |
| 002B | A8 | | STN | 0 | |
| 002C | 81 | | LR | WK4 | |
| 002D | AF | | S1 | | |
| 002E | 01 | | STR | WK4 | |
| 002F | A0 | | LBR | WK3 | |
| 0030 | 4039 | | CJE | TB4 | |
| 0032 | 2024 | | BR | TB5 | |
| 0034 | 86 | TB1 | LR | WK2 | |
| 0035 | AE | | A1 | | |
| 0036 | 06 | | STR | WK2 | |
| 0037 | 2019 | | BR | TB3 | |
| 0039 | 87 | TB4 | LR | WK1 | STORE TAB |
| 003A | A0 | | LBR | WK3 | |
| 003B | A8 | | STN | 0 | |
| 003C | 70 | PARIND | LDL | 0 | FIND TAB STORAGE TO THE RIGHT, |
| 003D | 07 | | STR | WK1 | OF THE PRESENT STORAGE POSITION |
| 003E | A7 | PAR3 | LBR | WK1 | |
| 003F | B0 | | LN | 0 | |
| 0040 | A2 | | LBR | LCNT | |
| 0041 | 6045 | | CJL | PAR4 | |
| 0043 | 20F0 | | BR | PAR2 | |
| 0045 | 40F0 | PAR4 | CJE | PAR2 | |

APPENDIX B-continued

| | | | | | |
|---|---|---|---|---|---|
| 0047 | 07 | | STR | WK1 | |
| 0048 | 70 | | LDL | 0 | |
| 0049 | 06 | | STR | WK2 | |
| 004A | 0C | | STR | LM | NEW LEFT MARGIN |
| 004B | 87 | P1 | LR | WK1 | CALCULATE DISTANCE TO TRAVEL BACK |
| 004C | AF | | S1 | | |
| 004D | 07 | | STR | WK1 | |
| 004E | 82 | | LR | LCNT | |
| 004F | AF | | S1 | | |
| 0050 | 02 | | STR | LCNT | |
| 0051 | AB00 | | LBD | X'0' | WK1 CONTAINS LARGE DISTANCE |
| 0053 | 4057 | | CJE | P2 | |
| 0055 | 204B | | BR | P1 | |
| 0057 | 86 | P2 | LR | WK2 | |
| 0058 | AE | | A1 | | |
| 0059 | AE | | A1 | | |
| 005A | AE | | A1 | | |
| 005B | AE | | A1 | | |
| 005C | AE | | A1 | | |
| 005D | 06 | | STR | WK2 | |
| 005E | 87 | | LR | WK1 | |
| 005F | AF | | S1 | | |
| 0060 | 07 | | STR | WK1 | |
| 0061 | 86 | P3 | LR | WK2 | WK2 CONTAINS SHORT DISTANCE |
| 0062 | AF | | S1 | | |
| 0063 | 06 | | STR | WK2 | |
| 0064 | 83 | | LR | MINI | |
| 0065 | AF | | S1 | | |
| 0066 | 03 | | STR | MINI | |
| 0067 | AB00 | | LBD | X'0' | |
| 0069 | 4061 | | CJE | P3 | |
| 006B | 87 | P4 | LR | WK1 | SAVE CALCULATED DISTANCE FOR RETURN |
| 006C | 09 | | STR | WK5 | |
| 006D | 86 | | LR | WK2 | |
| 006E | 0D | | STR | WK6 | |
| 006F | 9F | | LR | PM | MOVE CARRIER BACKWARD |
| 0070 | 59 | | SBS | REVMAG | |
| 0071 | 5B | | SBS | ESCMAG | |
| 0072 | 9F | P5 | LR | SENSOR | TRAVEL MINI DISTANCE |
| 0073 | E872 | | TJN | EMT,P5 | |
| 0075 | 86 | | LR | WK2 | |
| 0076 | AF | | S1 | | |
| 0077 | 06 | | STR | WK2 | |
| 0078 | AB00 | | LBD | X'0' | |
| 007A | 407E | | CJE | P6 | |
| 007C | 2072 | | BR | P5 | |
| 007E | 75 | P6 | LDL | 5 | |
| 007F | 00 | | STR | WK3 | |
| 0080 | 9F | P7 | LR | SENSOR | TRAVEL MAXI DISTANCE |
| 0081 | C880 | | TJE | EMT,P7 | |
| 0083 | 80 | | LR | WK3 | |
| 0084 | AF | | S1 | | |
| 0085 | 00 | | STR | WK3 | |
| 0086 | AB00 | | LBD | X'0' | |
| 0088 | 408C | | CJE | P8 | |
| 008A | 2080 | | BR | P7 | |
| 008C | 87 | P8 | LR | WK1 | |
| 008D | AF | | S1 | | |
| 008E | 07 | | STR | WK1 | |
| 008F | AB00 | | LBD | X'0' | |
| 0091 | 4095 | | CJE | P9 | |
| 0093 | 207E | | BR | P6 | |
| 0095 | 9F | P9 | LR | PM | TRAVEL FINISHED |
| 0096 | 51 | | RBS | REVMAG | |
| 0097 | 53 | | RBS | ESCMAG | |
| 0098 | 2000 | | BR | START | |
| 009A | 8E | INDCLR | LR | PLM | GO BACK TO NEW LEFT MARGIN |
| 009B | 0C | | STR | LM | |
| 009C | 07 | | STR | WK1 | |
| 009D | 70 | | LDL | 0 | |
| 009E | 06 | | STR | WK2 | |
| 009F | 2000 | | BR | START | |
| 00A1 | 87 | CR1 | LR | WK1 | CALCULATE DISTANCE TO TRAVEL BACK |
| 00A2 | AF | | S1 | | |
| 00A3 | 07 | | STR | WK1 | |
| 00A4 | 82 | | LR | LCNT | |
| 00A5 | AF | | S1 | | |
| 00A6 | 02 | | STR | LCNT | |
| 00A7 | AB00 | | LBD | X'0' | WK1 CONTAINS LARGE DISTANCE |
| 00A9 | 40AD | | CJE | CR2 | |
| 00AB | 20A1 | | BR | CR1 | |
| 00AD | 86 | CR2 | LR | WK2 | |

APPENDIX B-continued

| | | | | | |
|---|---|---|---|---|---|
| 00AE | AE | | A1 | | |
| 00AF | AE | | A1 | | |
| 00B0 | AE | | A1 | | |
| 00B1 | AE | | A1 | | |
| 00B2 | AE | | A1 | | |
| 00B3 | 06 | | STR | WK2 | |
| 00B4 | 87 | | LR | WK1 | |
| 00B5 | AF | | S1 | | |
| 00B6 | 07 | | STR | WK1 | |
| 00B7 | 86 | CR3 | LR | WK2 | WK2 CONTAINS SHORT DISTANCE |
| 00B8 | AF | | S1 | | |
| 00B9 | 06 | | STR | WK2 | |
| 00BA | 83 | | LR | MINI | |
| 00BB | AF | | S1 | | |
| 00BC | 03 | | STR | MINI | |
| 00BD | AB00 | | LBD | X'0' | |
| 00BF | 40B7 | | CJE | CR3 | |
| 00C1 | 87 | CR4 | LR | WK1 | SAVE CALCULATED DISTANCE FOR RETURN |
| 00C2 | 09 | | STR | WK5 | |
| 00C3 | 86 | | LR | WK2 | |
| 00C4 | 0D | | STR | WK6 | |
| 00C5 | 9F | | LR | PM | MOVE CARRIER BACKWARD |
| 00C6 | 59 | | SBS | REVMAG | |
| 00C7 | 5B | | SBS | ESCMAG | |
| 00C8 | 9F | CR5 | LR | SENSOR | TRAVEL MINI DISTANCE |
| 00C9 | E8C8 | | TJN | EMT,CR5 | |
| 00CB | 86 | | LR | WK2 | |
| 00CC | AF | | S1 | | |
| 00CD | 06 | | STR | WK2 | |
| 00CE | AB00 | | LBD | X'0' | |
| 00D0 | 40D4 | | CJE | CR6 | |
| 00D2 | 20C8 | | BR | CR5 | |
| 00D4 | 75 | CR6 | LDL | 5 | |
| 00D5 | 00 | | STR | WK3 | |
| 00D6 | 9F | CR7 | LR | SENSOR | TRAVEL MAXI DISTANCE |
| 00D7 | C8D6 | | TJE | EMT,CR7 | |
| 00D9 | 80 | | LR | WK3 | |
| 00DA | AF | | S1 | | |
| 00DB | 00 | | STR | WK3 | |
| 00DC | AB00 | | LBD | X'0' | |
| 00DE | 40E2 | | CJE | CR8 | |
| 00E0 | 20D6 | | BR | CR7 | |
| 00E2 | 87 | CR8 | LR | WK1 | |
| 00E3 | AF | | S1 | | |
| 00E4 | 07 | | STR | WK1 | |
| 00E5 | AB00 | | LBD | X'0' | |
| 00E7 | 40EB | | CJE | CR9 | |
| 00E9 | 207E | | BR | P6 | |
| 00EB | 9F | CR9 | LR | PM | TRAVEL FINISHED |
| 00EC | 51 | | RBS | REVMAG | |
| 00ED | 53 | | RBS | ESCMAG | |
| 00EE | 2000 | | BR | START | |
| 00F0 | 87 | PAR2 | LR | WK1 | |
| 00F1 | AE | | A1 | | |
| 00F2 | 07 | | STR | WK1 | |
| 00F3 | 203E | | BR | PAR3 | |
| 00F5 | 82 | LMSET | LR | LCNT | SET LEFT MARGIN |
| 00F6 | 0E | | STR | PLM | |
| 00F7 | 0C | | STR | LM | |
| 00F8 | 2000 | | BR | START | |
| 00FA | AC | OTHERS | H | | |

APPENDIX C

| INSTRUCTION | MNEUMONIC | FIRST BYTE | | | | | | | | SECOND BYTE | | | | | | | |
|---|---|---|---|---|---|---|---|---|---|---|---|---|---|---|---|---|---|
| | | 8 | 7 | 6 | 5 | 4 | 3 | 2 | 1 | 8 | 7 | 6 | 5 | 4 | 3 | 2 | 1 |
| TEST BIT - JUMP EQUAL | TJE | 1 | 1 | 0 | B | B | B | A | A | A | A | A | A | A | A | A |
| TEST BIT - JUMP NOT EQUAL | TJN | 1 | 1 | 1 | B | B | B | A | A | A | A | A | A | A | A | A |
| COMPARE - JUMP EQUAL | CJE | 0 | 1 | 0 | 0 | A | A | A | A | A | A | A | A | A | A | A |
| COMPARE - JUMP LESS | CJL | 0 | 1 | 1 | 0 | A | A | A | A | A | A | A | A | A | A | A |
| BRANCH | BR | 0 | 0 | A | A | A | A | A | A | A | A | A | A | A | A | A |
| LOAD DIRECT LOW | LDL | 0 | 1 | 1 | 1 | D | D | D | D | | | | | | | |
| LOAD DIRECT HIGH | LDH | 1 | 0 | 1 | 0 | 1 | 0 | 1 | 0 | D | D | D | D | D | D | D |
| LOAD REGISTER | LR | 1 | 0 | 0 | R | R | R | R | R | | | | | | | |
| LOAD INDIRECT | LN | 1 | 0 | 1 | 1 | A | A | A | A | | | | | | | |
| LOAD B DIRECT | LBD | 1 | 0 | 1 | 0 | 1 | 0 | 1 | 1 | D | D | D | D | D | D | D |
| STORE REGISTER | STR | 0 | 0 | 0 | R | R | R | R | R | | | | | | | |
| STORE INDIRECT | STN | 1 | 0 | 1 | 0 | 1 | 0 | 0 | 0 | | | | | | | |
| SET BIT AND STORE | SBS | 0 | 1 | 0 | 1 | 1 | B | B | B | | | | | | | |
| RESET BIT AND STORE | RBS | 0 | 1 | 0 | 1 | 0 | B | B | B | | | | | | | |
| INCREMENT | A1 | 1 | 0 | 1 | 0 | 1 | 1 | 1 | 0 | | | | | | | |

APPENDIX C-continued

| INSTRUCTION | MNEUMONIC | FIRST BYTE |   |   |   |   |   |   |   | SECOND BYTE |   |   |   |   |   |   |   |
|---|---|---|---|---|---|---|---|---|---|---|---|---|---|---|---|---|---|
|   |   | 8 | 7 | 6 | 5 | 4 | 3 | 2 | 1 | 8 | 7 | 6 | 5 | 4 | 3 | 2 | 1 |
| DECREMENT | SI | 1 | 0 | 1 | 0 | 1 | 1 | 1 | 1 |   |   |   |   |   |   |   |   |
| NO OPERATION | NOP | 1 | 0 | 1 | 0 | 1 | 1 | 0 | 1 |   |   |   |   |   |   |   |   |
| EMITTER | ER | 1 | 0 | 1 | 0 | 1 | 0 | 0 | 1 |   |   |   |   |   |   |   |   |

APPENDIX D

Instruction Summary

| Mnemonic | Name | Description |
|---|---|---|
| TJE B,A | Test Bit - Jump Equal | Test bit B in the accumulator and when on, branch to A. |
| TJN B,A | Test Bit - Jump Unequal | Test bit B in the accumulator and when off branch to A. |
| CJE R,A | Compare - Jump Equal | Compare byte R in B register with accumulator and when equal branch to A. |
| CJL R,A | Compare - Jump Low | Compare accumulator to byte R in B register and when accumulator is less than R branch to A. |
| BR A | Branch | Branch to A. |
| J A | Jump | Jump to A. |
| LDL D | Load Direct Low | Load low half of the accumulator from the instruction. Zero high half. |
| LDH D | Load Direct | Load the accumulator from the instruction. |
| LR R | Load Register | Load accumulator from direct memory. Place direct memory address in storage address Register. |
| LBR R | Load B Register | Load the B Register from direct memory. |
| LN A | Load Indirect | Load the accumulator from indirect memory. (Address given by B Register and 4 bits of the instruction.) |
| STR R | Store Register | Store the accumulator in direct memory. Place direct memory address. |
| STN | Store Indirect | Store the accumulator in indirect memory (Address in Register.) |
| SBS B | Set Bit and Store | Set bit B in direct memory (address in Storage Address Register) to 1. |
| RBS B | Reset Bit and Store | Set bit B in direct memory (address in Storage Address Register) to 0. |
| AI | Increment | Add one to the accumulator. |
| SI | Decrement | Subtract one from the accumulator. |
| NOP | No Operation | Go to next instruction. |
| ER | Emitter Reset | Reset Emitter latch. |

We claim:

1. A paragraph indentation control for a typewriter, said typewriter and control comprising a print point defining means movable with respect to a writing line, return means for returning said print point defining means to a line beginning position, line beginning defining means for defining the line beginning, comprising:
   a keyboard line beginning control key for creating a line beginning command;
   said line beginning defining means further comprising:
   control means including line beginning storage means for storing an indication of said line beginning position;
   a temporary line beginning storage means for storing a line beginning position and accessable by said control means;
   means for indicating the position of said print point defining means;
   escapement logic means for determining the difference between said line beginning indication and said print point position indication and escapement counter means for receiving said difference and controlling said return means in response to operation of said keyboard line beginning control key;
   said line beginning defining means further comprising:
   means for temporarily replacing the contents of said temporary line beginning storage means with an indication differing from that previously stored therein, in response to a control signal from said line beginning control key whereby said print point defining means is escaped directly to a print line position corresponding to the value stored in said temporary line beginning storage means in response to the operator of said return means.

2. The paragraph indentation control of claim 1 wherein said temporary line beginning storage means is accessable by said control means to store said indication of said line beginning position, in response to a keyboard control signal to negate the effect of the indication previously stored in said temporary line beginning storage means.

3. The paragraph indentation control of claim 1 wherein said control means further comprises tabulation means comprising a tab stop storage means for storing preselected tab position indications;
   means for moving said print point defining means to the next preselected tab stop position and wherein said control means is responsive to said line beginning control key to initiate the movement of said print point defining means by operation of said tabulation means and is further responsive to said control operation to store the indication corresponding to said tab stop position in said temporary line beginning storage means.

4. Paragraph indentation control for a typewriter, said typewriter comprising a print point defining means moveable with respect to a writing line, return means for returning said print point defining means to a line beginning position, a line beginning defining means for defining the line beginning, comprising:
   a keyboard line beginning control key means operative to create a line beginning command;
   a control means including a position register for maintaining a representation of the position of said print point defining means;
   logic means for storing in said position register an indication of the position of said print point defining means in response to any operation of said typewriter requiring movement of said print point defining means;
   said control means further including a first margin register storage means for storing an indication of the position of the line beginning;
   a second margin register storage means for storing a second line beginning position value and accessible by said control means;
   said control means further comprising said line beginning defining means for storing in said first and second margin register storage means an indication of the position of said print point defining means upon the activation of said control means;

said line beginning defining means further temporarily replacing the contents of said second margin register storage means with an indication derived from the position of said print point defining means, differing from that previously stored therein, in response to a control signal from said keyboard line beginning control key means, said logic means further operative for determining the difference between said line beginning indication in said second margin register storage means and said print point defining means position indication, and;

escapement counter means for receiving said difference and controlling said return means in response to the operation of said keyboard line beginning control key means, whereby said print point defining means is escaped directly to a print line position corresponding to the indication stored in said second margin register storage means, in response to the operation of said return means, and the keyboard line beginning control key means.

* * * * *